US012327906B2

(12) United States Patent
Xie et al.

(10) Patent No.: US 12,327,906 B2
(45) Date of Patent: Jun. 10, 2025

(54) TERMINAL DEVICE

(71) Applicant: BEIJING XIAOMI MOBILE SOFTWARE CO., LTD., Beijing (CN)

(72) Inventors: Wanbo Xie, Beijing (CN); Shaoshu Sha, Beijing (CN); Tao Jiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 127 days.

(21) Appl. No.: 18/070,360

(22) Filed: Nov. 28, 2022

(65) Prior Publication Data

US 2024/0055750 A1 Feb. 15, 2024

(30) Foreign Application Priority Data

Aug. 11, 2022 (CN) ........................ 202210964319.0

(51) Int. Cl.

| | |
|---|---|
| ***H01Q 1/22*** | (2006.01) |
| ***H01Q 1/48*** | (2006.01) |
| ***H01Q 9/04*** | (2006.01) |

(52) U.S. Cl.

CPC ................. *H01Q 1/22* (2013.01); *H01Q 1/48* (2013.01); *H01Q 9/045* (2013.01)

(58) Field of Classification Search

CPC ............ H01Q 1/22; H01Q 1/48; H01Q 9/045; H01Q 1/243; H01Q 13/18; H01Q 9/0421

USPC .......................................................... 343/702

See application file for complete search history.

(56) References Cited

U.S. PATENT DOCUMENTS

| | | | | |
|---|---|---|---|---|
| 2013/0229318 | A1* | 9/2013 | Ng | H01Q 5/30 343/770 |
| 2014/0029388 | A1* | 1/2014 | Fujisawa | G04R 60/12 368/47 |
| 2018/0006360 | A1* | 1/2018 | Camacho Perez | H01Q 21/28 |
| 2018/0239308 | A1* | 8/2018 | Yamamoto | G04R 60/10 |
| 2020/0099138 | A1* | 3/2020 | Garrido Lopez | H01Q 9/0407 |

FOREIGN PATENT DOCUMENTS

| | | | | |
|---|---|---|---|---|
| EP | 1134837 | A1 * | 9/2001 | G04B 47/00 |

OTHER PUBLICATIONS

Extended European Search Report of EP Application No. 22211411.8 dated Aug. 14, 2023, (12p).

* cited by examiner

*Primary Examiner* — Hoang V Nguyen
*Assistant Examiner* — Brandon Sean Woods
(74) *Attorney, Agent, or Firm* — Arch & Lake LLP; Hao Tan; Shen Wang

(57) ABSTRACT

A terminal device includes a display component, a housing component, and an antenna component. The display component is connected with the housing component, and the antenna component is located inside the housing component. The antenna component includes a radiating metal sheet, at least one first grounding structure and at least one feeding point. The radiating metal sheet includes a first radiating part that extends parallel to the display component and a second radiating part that extends away from the display component. The second radiating part is connected to at least part of a circumferential edge of the first radiating part. The at least one feeding point is located on a surface of the first radiating part. The at least one first grounding structure is located at an end of the second radiating part.

20 Claims, 7 Drawing Sheets

TERMINAL DEVICE

CROSS-REFERENCE TO RELATED APPLICATION

This application is based on and claims priority to Chinese Patent Application No. 202210964319.0 filed on Aug. 11, 2022, the disclosure of which is hereby incorporated by reference in its entirety for all purposes.

TECHNICAL FIELD

The present disclosure relates to electronic technologies, and more specifically, to a terminal device.

BACKGROUND

A metal unibody is formed by processing a piece of metal material (e.g., aluminum alloy) into parts having an integrated structural feature by Computer Numerical Control (CNC), stamping and other techniques. This type of parts has the characteristics of integrity, that is, it can serve as most of the appearance of a product, and meanwhile it also serves as a fixing frame for internal parts. It has the advantages of good appearance integrity, simple and beautiful appearance, few assembly process and high design freedom.

Therefore, the metal unibody has been widely applied in smart phones, notebook computers, tablet computers and other terminal devices.

SUMMARY

The present disclosure discloses a terminal device.

According to an example of the present disclosure, a terminal device is provided, and the terminal device includes a display component, a housing component and an antenna component; the display component is connected with the housing component, and the antenna component is located inside the housing component; the antenna component includes a radiating metal sheet, at least one first grounding structure and at least one feeding point; the radiating metal sheet includes a first radiating part that extends parallel to the display component, and a second radiating part that extends away from the display component; the second radiating part is connected to at least part of a circumferential edge of the first radiating part; and the at least one feeding point is located on a surface of the first radiating part, and the at least one first grounding structure is located at an end of the second radiating part.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
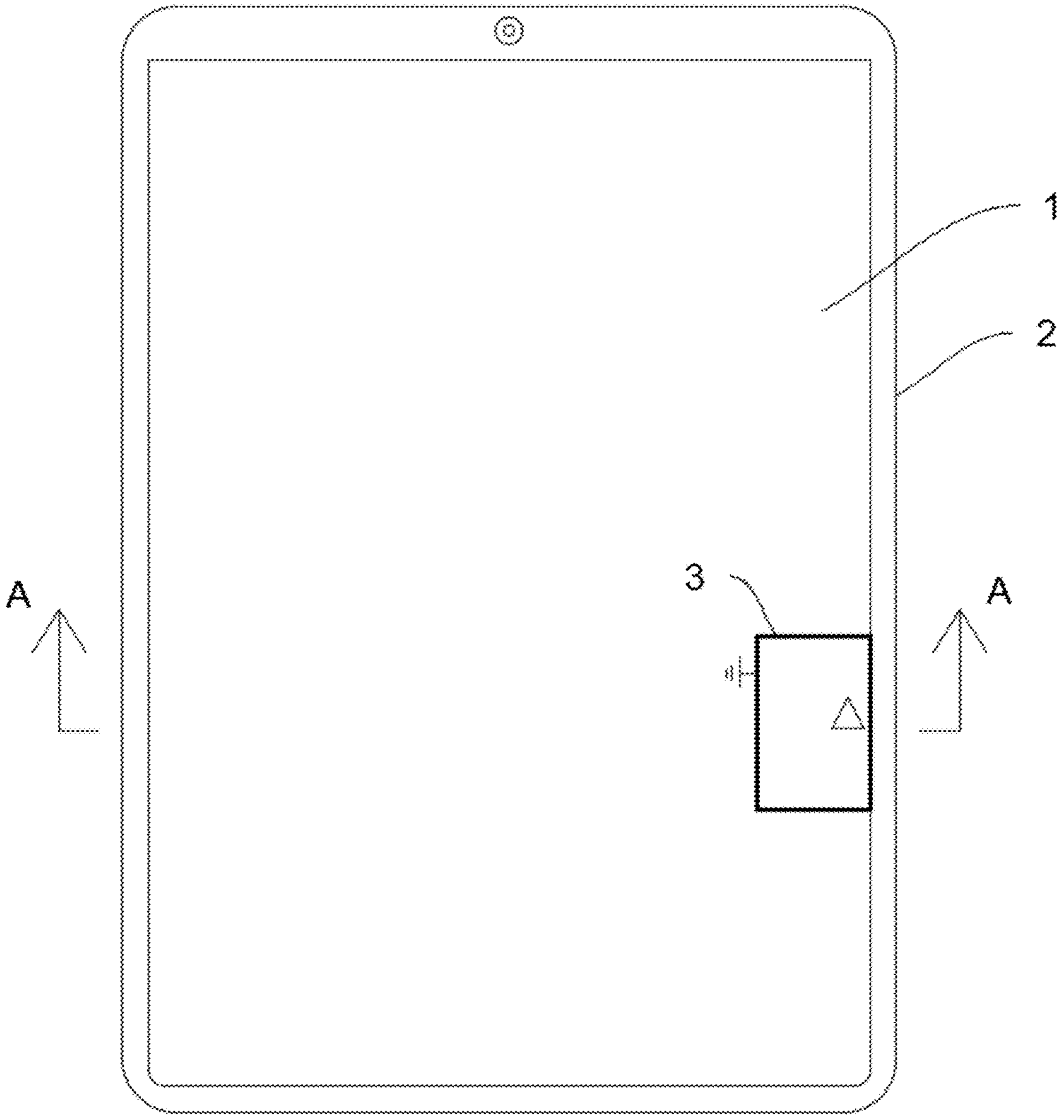
FIG. 1 is a schematic structural diagram of a terminal device provided by some embodiments of the present disclosure.

Description will now be made in detail to exemplary embodiments, examples of which are illustrated in the accompanying drawings. The following description refers to the accompanying drawings in which the same numbers in different drawings represent the same or similar elements unless otherwise indicated. The implementations in the following description of exemplary embodiments do not represent all implementations consistent with the present disclosure. Instead, they are merely examples of apparatuses and methods consistent with some aspects of the disclosure as detailed in the appended claims.

In the description of the present disclosure, it should be understood that the orientation and position relationship indicated by the terms “center”, “longitudinal”, “lateral”, “length”, “width”, “thickness”, “up”, “down”, “front”, “back”, “left”, “right”, “vertical”, “horizontal”, “top”, “bottom”, “inside”, “outside”, “clockwise”, “counterclockwise”, “axial”, “radial”, “circumferential” and so on are based on the orientation or position relationship shown in the drawings and are intended only to facilitate the description of the present disclosure and simplify the description, rather than indicating or implying that the referred apparatuses or elements must have a specific orientation, must be constructed and operated in a specific orientation, and therefore should not be construed as a limitation to the present disclosure.

It should be understood that “electrical connection” in the present disclosure can be understood as physical contact and electrical conduction of components; it can also be understood as the form that different components in the circuit structure are connected by physical circuits which can transmit electrical signals, such as printed circuit board (PCB), copper foil or wire. “Communication connection” can refer to the transmission of electrical signals, including wireless communication connection and wired communication connection. Wireless communication connection does not need physical media and does not belong to the connection relationship that defines the product structure. “Be connected to” and “be connected with” both can refer to mechanical connection or physical connection, that is, A and B being connected with each other or A being connected to B means that there are fastening components (such as screws, bolts, rivets, etc.) between A and B, or A and B are in contact with each other and it is difficult to separate them.

Unless otherwise defined, all technical terms used in the embodiments of the present disclosure have the same meanings as commonly understood by those of ordinary skill in the art.

With the continuous improvement of the number and radiation performance of antennas integrated in terminal device, the stacking contradiction between the metal unibody and the antennas is becoming more and more prominent. In the related technologies, the rear-camera cover antenna, the screen black edge antenna, etc. are usually adopted, but the above schemes generally have some problems, such as complex structures and processes, high product cost and poor consistency.

In the metal unibody, the body appearance needs to be free of broken seams and slots, such that it is difficult to stack antennas. The rear-camera cover antenna adopted in the related technologies is to arrange the antenna under the cover of the rear camera of the terminal device and to hide the gap of the antenna by the cover.

The screen black edge antenna adopted in the related technologies needs to be welded on the circuit board by coaxial wire for feeding. The circuit board is fixed on the metal back cover (i.e., the metal unibody) by screws. There are two layers of the circuit board, the feeding is on the upper layer of circuit board and coupled to the lower layer of circuit board, and the lower layer of circuit board is grounded through steel sheets and other structures. Herein, the coaxial wire and the double-layer circuit board are arranged in the black edge area of the screen to radiate energy outward. This type of screen black edge antenna has a complicated structure, and the main structure is arranged in the black edge area of the screen, thereby the layout freedom is low, and the assembly difficulty is high. Meanwhile, the antenna will increase the width of the black edge of the terminal device.

Therefore, the present disclosure provides the terminal device having advantages of simple antenna component structure, simple production and assembly process, low product cost, good consistency, etc.

The technical solutions provided by the present disclosure are applicable to terminal devices adopting one or more of the following communication technologies: Blue Tooth (BT) communication technology, Global Positioning System (GPS) communication technology, Wireless Fidelity (WiFi) communication technology, Global System For Mobile Communications (GSM) communication technology, Wideband Code Division Multiple Access (WCDMA) communication technology, Long Term Evolution (LTE) communication technology, 5G communication technology and other communication technologies in the future.

The terminal devices in the embodiments of the present disclosure can be mobile phones, tablet computers, notebook computers, smart bracelets, smart watches, smart helmets, smart glasses, etc. The electronic devices can also be cellular phones, cordless phones, session initiation protocol (SIP) phones, wireless local loop (WLL) stations, personal digital assistant (PDA), handheld devices with wireless communication function, computing device or other processing devices connected to wireless modem, vehicle-mounted device, electronic devices in 5G network, or electronic devices in Public Land Mobile Network (PLMN) that will evolve in the future, etc., the embodiments of the present disclosure are not limited thereto.

In order to make the purposes, technical solutions and advantages of the present disclosure clearer, the embodiments of the present disclosure will be described in further detail below with reference to the drawings.

Figure 2:
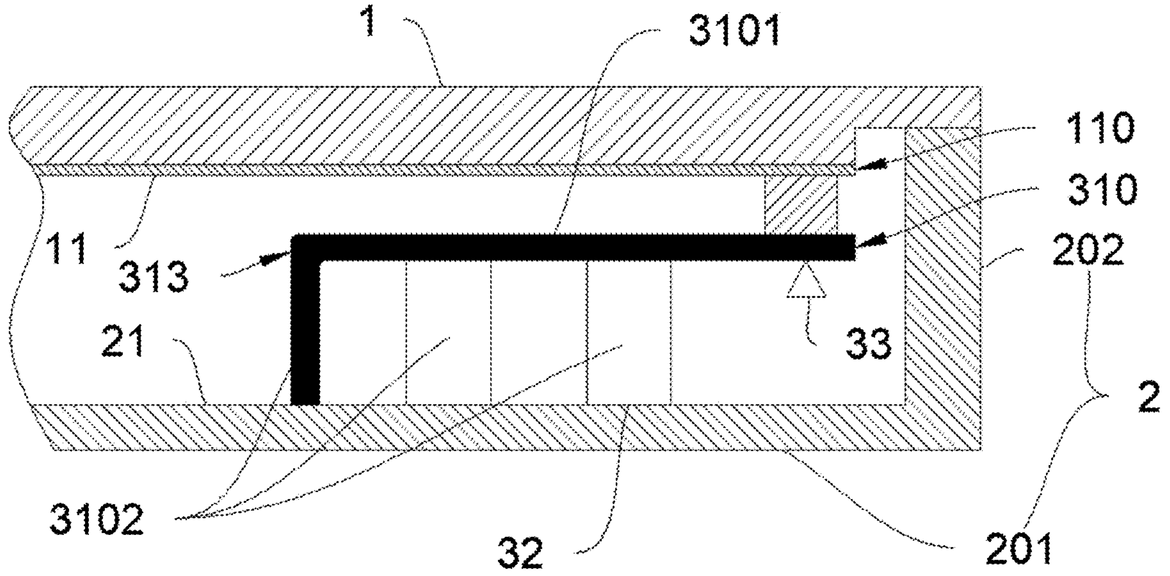
FIG. 2 is a sectional view of a partial structure of a terminal device provided by some embodiments of the present disclosure.
Figure 3:
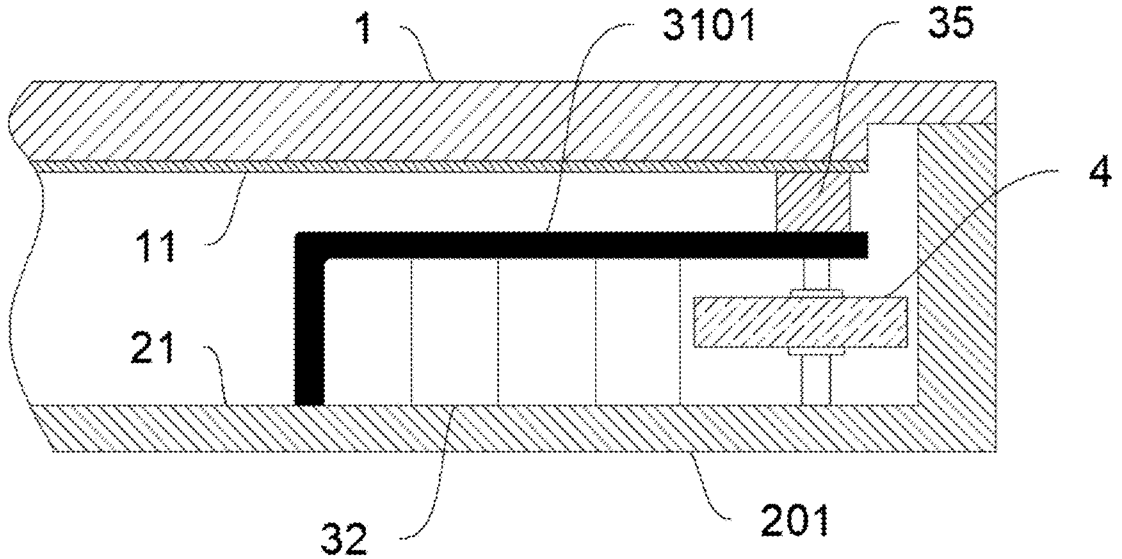
FIG. 3 is a sectional view of a partial structure of a terminal device provided by another embodiment of the present disclosure.
Figure 4:
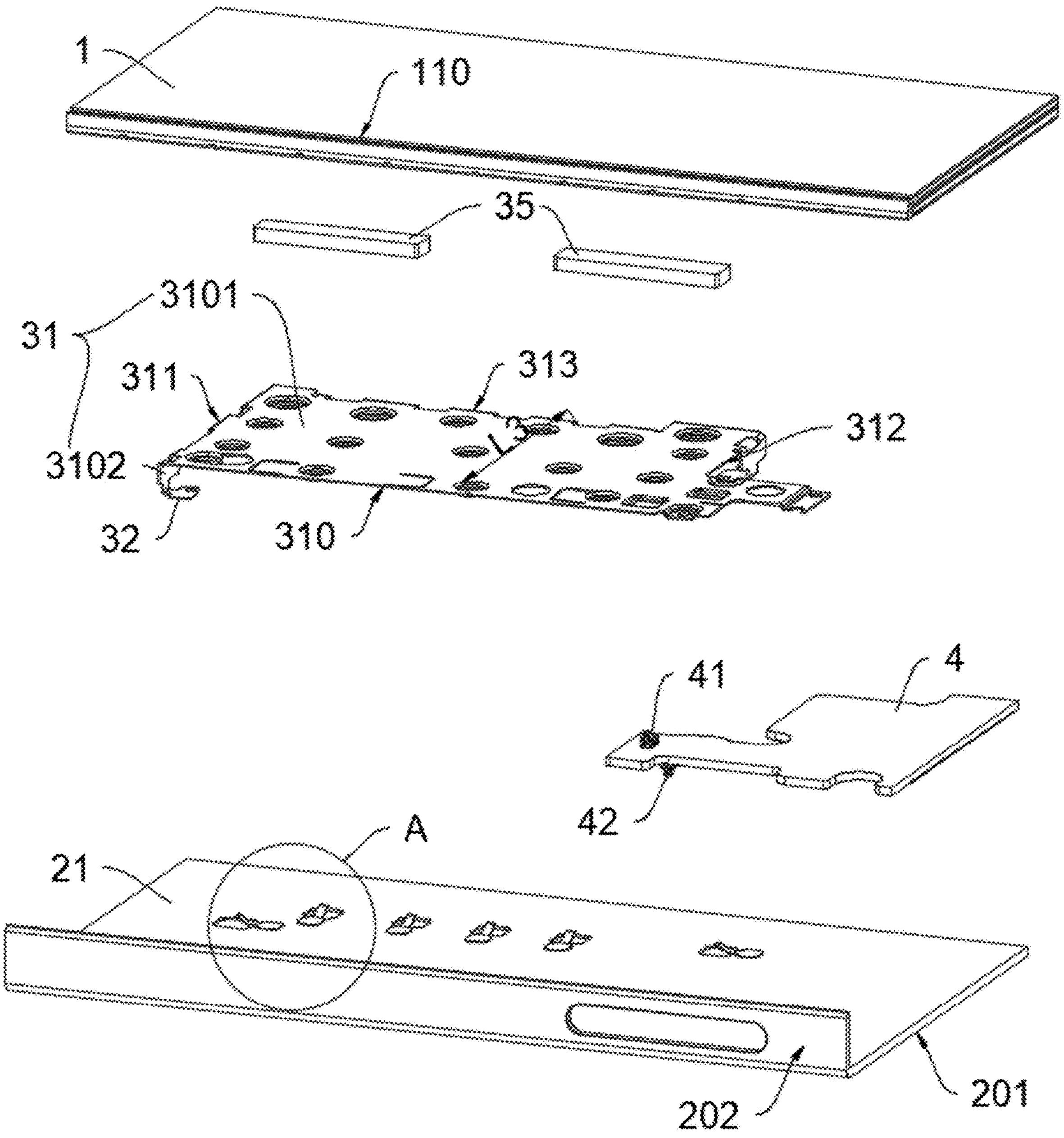
FIG. 4 is a structural explosion diagram of a terminal device provided by some embodiments of the present disclosure.

FIG. 1 is a schematic structural diagram of a terminal device provided by some embodiments of the present disclosure; FIG. 2 is a sectional view of a partial structure of a terminal device provided by some embodiments of the present disclosure, and the sectional position shown in FIG. 2 is shown as A-A in FIG. 1; FIG. 3 is a sectional view of a partial structure of a terminal device provided by another embodiment of the present disclosure; and FIG. 4 is a structural explosion diagram of a terminal device provided by some embodiments of the present disclosure;

Herein, the terminal device is described as a tablet computer, but it should not be construed as a limitation to the technical solutions of the present disclosure.

Referring to FIGS. 1 to 4, it is provided in the embodiments a terminal device, the terminal device includes a display component 1, a housing component 2 and an antenna component 3; the display component 1 is connected to the housing component 2, and the antenna component 3 is located inside the housing component 2.

The antenna component 3 includes a radiating metal sheet 31, at least one first grounding structure 32 and at least one feeding point 33.

The radiating metal sheet 31 includes a first radiating portion 3101 that extends parallel to the display component 1 and a second radiating portion 3102 that extends away from the display component 1; the second radiating part 3102 is connected to at least part of a circumferential edge of the first radiating part 3101.

The at least one feeding point 33 is located on a surface of the first radiating part 3101, and the at least one first grounding structure 32 is located at an end of the second radiating part 3102.

The terminal device of the embodiment includes the display component, the housing component and the antenna component, the antenna component is located inside the housing component, and the antenna component includes the first radiating part that extends parallel to the display component and the second radiating part that extends away from the display component, and the second radiating part is connected to the circumferential edge of the first radiating part, such that the radiating metal sheet has a dual structure of a patch antenna and a cavity antenna, resulting in that the antenna component has better radiation performance and can achieve a wider range of frequency coverage. The antenna component is of simple structure, has the advantages of simple production and assembly process, low product cost and good consistency.

Herein, the patch antenna is realized by using the part of the radiating metal sheet 31 parallel to the display component 1, it has good durability and easy manufacturing characteristic, and is less dependent on the volume, such that it is suitable for use in a limited space. The cavity antenna is realized by using the part of the radiating metal sheet 31 parallel to the display component 1 and the part away from the display component 1, to be able to enhance the radiation performance of the radiating metal sheet 31.

Herein, the number of the first grounding structure 32 is, for example, one, two, three, etc., and the number of the feeding point 33 is, for example, one, two, three, etc.

Referring to FIG. 2, in some possible implementations, the antenna component 3 is located inside the housing component 2 and within the coverage area of the display component 1; that is, the antenna component 3 is located below the screen of the terminal device, and the antenna component 3 radiates energy outward through the black edge area of the side edge of the display component 1, which is beneficial to reducing the assembly difficulty of the antenna component 3, reducing the space occupation of the black edge position of the side edge of the display component 1, and further increasing the screen ratio of the terminal device.

Exemplarily, the terminal device has a cube-like shape, the housing component 2 is located at the back of the terminal device and mainly achieves the supporting and protecting function, and the display component 1 is located at the front of the terminal device and realizes the displaying function of the terminal device.

Referring to FIGS. 2 and 4, the housing component 2 includes a back cover part 201 and a frame part 202.

The back cover part 201 corresponds to the back of the terminal device, and the frame part 202 can be divided into an upper frame, a lower frame, a left frame and a right frame, these frames are connected with each other, and a certain arc or chamfer can be formed at the connection thereof.

The frame part 202 is connected to the edge of the back cover part 201 and extends toward the front of the terminal device, such that the back cover part 201 and the frame part 202 enclose a cavity with an opening front (or described as the display direction of the terminal device). The display component 1 is connected to the opening so as to form the front of the terminal device and realize the display function of the terminal device.

In some possible implementations, the housing component 2 is a metal unibody, and is processed by CNC, stamping and other techniques. The material of the housing component 2 can include, but not limited to, aluminum alloy, zinc alloy, stainless steel, etc. Preferably, the housing component 2 is an aluminum alloy unibody.

Figure 6:
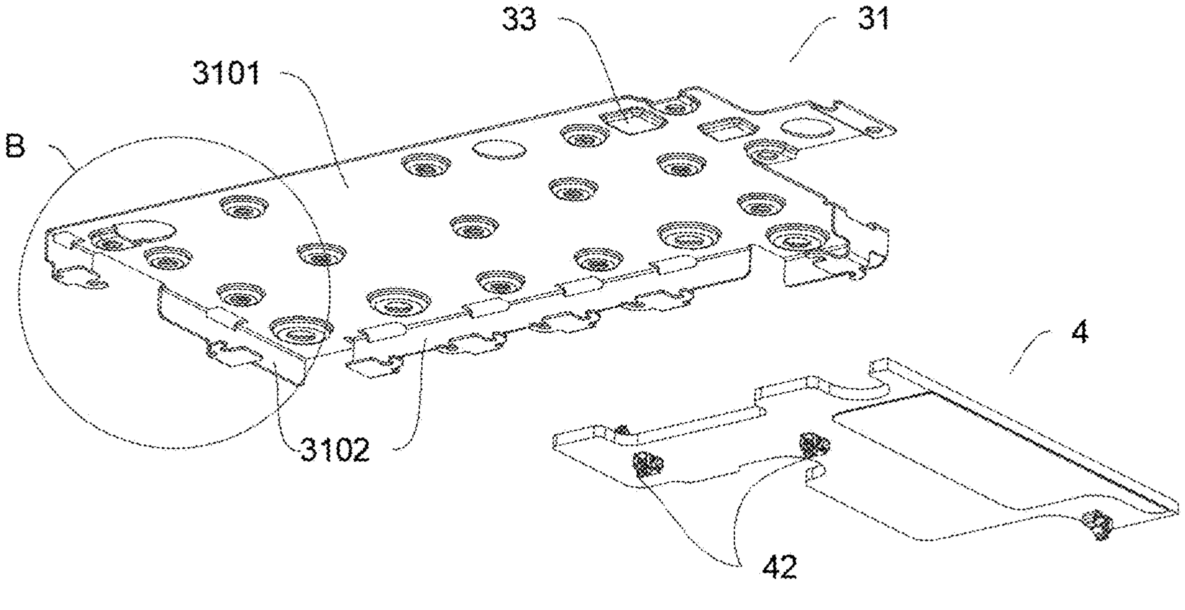
FIG. 6 is a schematic diagram of the position of a radiating metal sheet and a circuit board provided by some embodiments of the present disclosure.

Referring to FIGS. 4 and 6, in some possible implementations, the first radiating part 3101 and the second radiating part 3102 are of an integrated structure, and a patch antenna structure formed by stamping, injection molding, machining etc. Alternatively, the first radiating part 3101 and the second radiating part 3102 are realized by using Flexible Printed Circuit board (FPC) or copper skin.

The material of the radiating metal sheet 31 (including the first radiating part 3101 and the second radiating part 3102) includes, but not limited to, stainless steel, aluminum alloy, magnesium alloy etc.

Exemplarily, the number of the first grounding structure 32 is, for example, one, two, three, etc. A plurality of first grounding structures 32 can be uniformly or unevenly arranged to electrically connect the radiating metal sheet 31 and the first metal part 21.

The terminal device also includes electronic elements placed inside the cavity, including, but not limited to, motherboard, battery, camera, processor, flash, microphone, speaker, etc.

In some possible implementations, the display component 1 can be used to display information inputted by or provided to users as well as various graphical user interfaces of the terminal device, and these graphical user interfaces can be composed of graphics, texts, icons, videos and any combinations thereof.

The display component 1 can include a display panel; optionally, Plasma Display Panel (PDP), Vacuum Fluorescent Display (VFD), Field Emission Display (FED), Light Emitting Diode (LED), Organic Light-Emitting Diode (OLED), and Liquid Crystal Display (LCD), Micro-Electro-Mechanical System (DMD) and Electroluminance (EL) ink can be adopted to configure the display panel.

Further, the display panel is covered with a touch-sensitive surface, and when the touch-sensitive surface detects the touch operation on or near it, it transmits the same to the processor to determine the type of the touch event, thereafter the processor provides corresponding visual output on the display panel according to the type of the touch event.

Referring to FIGS. 2 and 4, in some embodiments, the housing component 2 includes the back cover part 201, and the back cover part 201 is provided parallel to the non-display side of the display component 1.

The antenna component 3 is located between the back cover part 201 and the display component 1; the side of the back cover part 201 facing the display component 1 is provided with the first metal part 21; and at least one first grounding structure 32 is electrically connected with the first metal part 21 so as to electrically ground the radiating metal sheet 31.

The antenna component 3 of the embodiment is connected with the back cover part 201 of the housing component 2, thereby assembly and grounding of the antenna component 3 are realized, such that there are the advantages of abundant assembly space and high design freedom, and the difficulty of production and assembly is correspondingly reduced. Meanwhile, the antenna component 3 does not need to occupy the black edge of the display component 1, to facilitate reducing the width of the black edge, increasing the area of the display component 1 and raising the screen ratio of the terminal device.

The antenna component 3 is electrically connected with the first metal part 21 of the back cover part 201 through the lower first grounding structure 32, so as to realize grounding of the antenna component 3. After the radiating metal sheet 31 is connected with a radio frequency module, resonance can be generated, and then energy is radiated outward, so as to realize wireless communication. The sheet-like radiation structure is convenient to be arranged inside the terminal device, has little influence on the thickness of the terminal device, and can provide enough radiation area.

Referring to FIG. 4, in some possible implementations, the first metal part 21 is located at the back cover part of the housing component 2, such that it is electrically connected to the radiating metal sheet 31 on the non-display surface side of the display component 1 through the first grounding structure 32, and the first grounding structure 32 can be located in the coverage area of the display component 1, thereby reducing space occupation of the frame area of the terminal device.

Optionally, when the housing component 2 in entirety is made of metal material, the back cover part in entirety serves as the first metal part 21. Optionally, the housing component 2 is made of metal and nonmetal materials, and the back cover part is all made of metal materials, or only the metal part arranged on the back cover part is used as the first metal part 21.

The housing component 2 includes the first metal part 21, the first metal part 21 is electrically connected with the radiating metal sheet 31 through the first grounding structure 32. As part of the housing component 2, the first metal part 21 can be used as the floor of the whole machine to realize grounding connection of the radiating metal sheet 31, such that the radiating metal sheet 31 can radiate energy outward.

Figure 7:
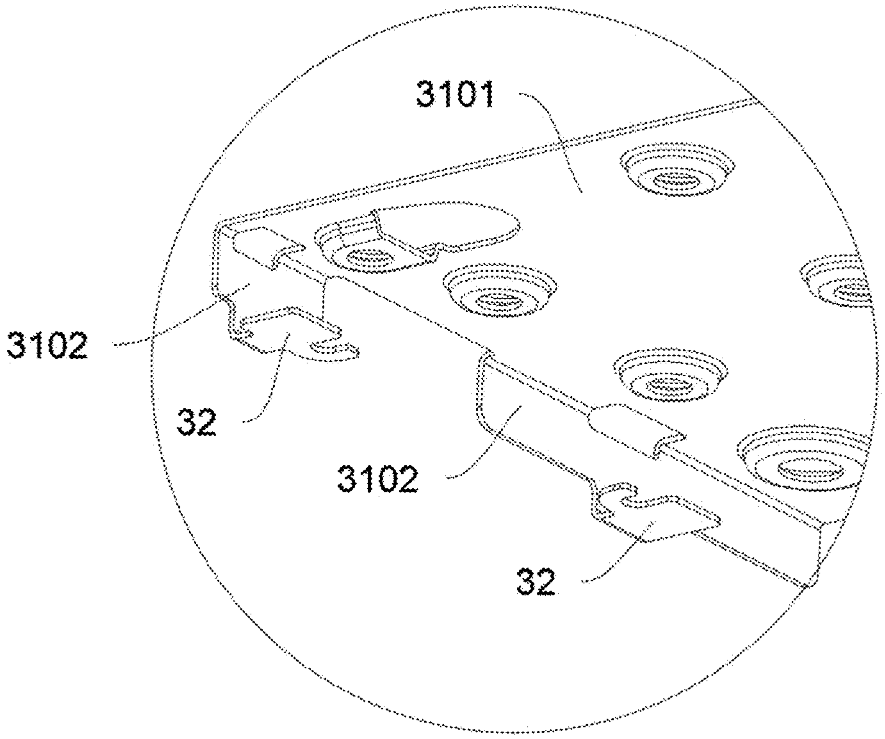
FIG. 7 is a partial enlarged view of B in FIG. 6.

Referring to FIGS. 6 and 7, in some embodiments, the second radiating part 3102 is formed by folding at least part of the edge of the first radiating part 3101 toward the first metal part 21.

At least part of the edge of the first radiating part 3101 is folded in the direction away from the display component 1 (or described as being proximate to the side where the first metal part 21 is located) to form the second radiating part 3102, such that the edge of the second radiating part 3102 is proximate to the first metal part 21, which facilitates the arrangement of the first grounding structure 32 and realizes grounding connection of the radiating metal sheet 31.

Referring to FIGS. 6 and 7, in other embodiments, the first grounding structure 32 is formed at the end of the second radiating part 3102, for example, the end of the second radiating part 3102 is folded, turned, rolled, etc., so as to increase the contact area of the second radiating part 3102 facing the first metal part 21, and thus it can be realized as the first grounding structure 32, to realize grounding connection of the radiating metal sheet 31. It has advantages of simple structure and convenient connection.

In some embodiments, at least one first grounding structure 32 includes conductive foam, conductive elastic sheet (conductive elastic sheets), and copper foil.

In some possible implementations, conductive foam refers to wrapping conductive cloth on flame retardant sponge, and after a series of treatments, it has good surface conductivity, and can be easily fixed on the device that needs to be shielded by adhesive tape.

Exemplarily, the conductive foam can be ordinary conductive foam, nickel-plated copper conductive foam, gold-plated conductive foam, carbon-plated conductive foam, tin-plated conductive foam, conductive aluminum foil foam, conductive copper foil foam, omni-directional conductive foam, Surface Mounted Technique (SMT) conductive foam, I/O conductive foam pad, etc.

In other possible implementations, the conductive elastic sheet is made of stainless steel or beryllium bronze, which can achieve the self-elastic effect by the characteristics of the material itself and achieve the contact goal. Exemplarily, the conductive elastic sheet is welded to the radiating metal sheet 31 or the first metal part 21, and extends elastically toward the other side, directly being pressed and deformed by the other side, and keeping in contact under the function of the pre-tightening force.

Figure 5:
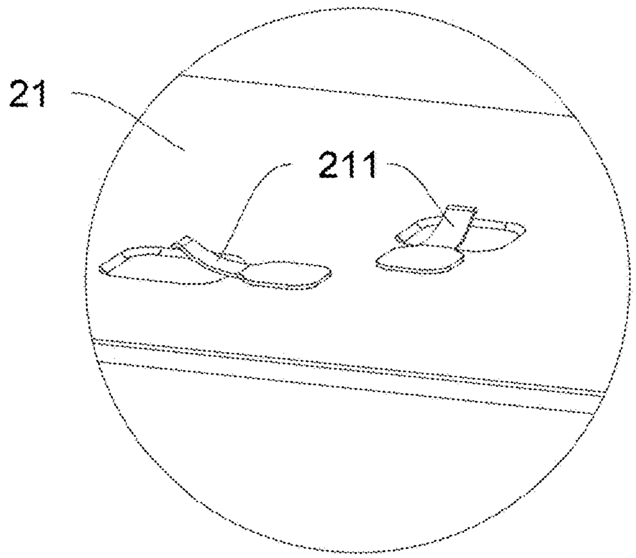
FIG. 5 is a partial enlarged view of A in FIG. 4.

Referring to FIGS. 4 and 5, at least one elastic sheet member 211 is electrically connected to the surface of the first metal part 21, the number and position of the at least one elastic sheet member 211 correspond to those of the at least one first grounding structure 32, and the at least one elastic sheet member 211 is electrically connected with the at least one first grounding structure 32.

In the embodiment, at least one elastic sheet member 211 is electrically connected to the surface of the first metal part 21, the elastic sheet member 211 can be in contact with the first grounding structure 32 in a crimping manner, to realize grounding of the radiating metal sheet 31, thereby effectively reducing processing difficulty of the radiating metal sheet 31, that is, the antenna component 3.

Referring to FIGS. 4 and 6, in some embodiments, the first radiating part 3101 is a polygonal structure, at least one side edge (e.g., the first side edge 310) of the first radiating part 3101 is proximate to the edge of the display component 1, and the second radiating part 3102 is connected to at least one of the other side edges (e.g., the second side edge 311, the third side edge 312, and the fourth side edge 313) of the first radiating part 3101.

The first radiating part 3101 which is polygonal as adopted in the embodiment has the advantages of simple production and processing, and is convenient for size design, the radiation performance of the antenna component 3 can be reasonably set by size design, which reduces the difficulty of designing and debugging the antenna component 3 and ensures radiation performance of the terminal device.

As conductive materials are inevitably used in the display component 1, this will adversely affect radiation performance of the antenna component 3, thus the antenna component 3 needs to make full use of the gap of the side edge of the display component 1 to radiate energy outward. In the embodiment, the second radiating part 3102 is disposed on the other side edge of the first radiating part 3101 that is not aligned with the edge of the display component 1, and the second radiating part 3102 is not disposed on the side edge of the first radiating part 3101 that is aligned with the edge of the display component 1, such that the radiating metal sheet 31 forms a radiating structure similar to "three side edges are surrounded and one side edge is open", and the radiated energy is concentrated on this side edge to radiate outward, and finally propagates outward through the side edge gap (i.e., the black edge area) of the display component 1, which is beneficial to improving radiation performance of the antenna assembly 3.

Referring to FIGS. 4 and 6, in some embodiments, each of the remaining side edges of the first radiating part 3101 is provided with at least one second radiating part 3102, and the end of each second radiating part 3102 is provided with at least one first grounding structure 32, respectively.

In order to ensure grounding performance of the radiating metal sheet 31, at least one second radiating part 3102 is respectively disposed on the other edges of the first radiating part 3101 except the side edge aligned with the display component 1, and the grounding of the radiating metal sheet 31 is realized by disposing the first grounding structure 32 in each second radiating part 3102, such that the current flow direction in the radiating metal sheet 31 is richer and the range of radiation frequencies that can be covered is wider.

Referring to FIGS. 4, 6, and 7, in some embodiments, the first radiating part 3101 includes a first side edge 310 proximate to the edge of the display component 1, a second side edge 311 and a third side edge 312 located at two ends of the first side edge 310 along the edge extending direction of the display component 1, and a fourth side edge 313 disposed in parallel and opposite to the first side edge 310.

The second side edge 311, the third side edge 312 and the fourth side edge 313 are respectively provided with at least one second radiating part 3102, and the end of each second radiating part 3102 is respectively provided with at least one first grounding structure 32.

The embodiment gives a specific scheme of the first radiating part 3101. Specifically, among the four side edges of the first radiating part 3101, the second side edge 311, the third side edge 312 and the fourth side edge 313, which do not correspond to the edge of the display component 1, are used for arranging the second radiating part 3102, and the first grounding structure 32 is disposed at the end of the second radiating part 3102 to realize grounding of the radiating metal sheet 31.

Exemplarily, the number of the second radiating parts 3102 in each side edge is, for example, one, two, three, etc. The second radiating part 3102 of each side edge can be the same as or different from the length of the side edge and can be reasonably selected based on the assembly requirements.

Exemplarily again, the number of the first grounding structure 32 connected to each second radiating part 3102 is, for example, one, two, three, etc. When the number of the first grounding structure 32 is two or more, the adjacent first grounding structures 32 are arranged at intervals.

Exemplarily again, in each side edge, the first grounding structures 32 to which all the second radiating parts 3102 are connected are arranged at uniform or non-uniform intervals along the side edge.

Referring to FIGS. 3, 4 and 6, in some embodiments, the terminal device further includes a circuit board 4, and at least part of the circuit board 4 extends below the first radiating part 3101.

At least one feeding point 33 is located on the lower surface of the first radiating part 3101; at least one feeding structure 41 is provided on the circuit board 4 corresponding to the at least one feeding point 33, and the at least one feeding structure 41 is electrically connected with the at least one feeding point 33.

In the embodiment, at least part of the circuit board 4 extends below the first radiating part 3101, and is electrically connected with at least one feeding point 33 on the first radiating part 3101 through at least one feeding structure 41, to realize the feeding of the antenna component 3.

Exemplarily, the number of the feeding structure 41 is the same as the number of the feeding point 33, such as one, two, three, etc. The number design of the feed structure 41 and the feed point 33 is beneficial to improving, enriching the types of feeding signals inputted by the circuit board 4 to the antenna component 3, and improving compatibility of the antenna component 3.

In some possible implementations, the circuit board 4 includes Printed Circuit Board (PCB), Flexible Printed Circuit board (FPC), soft and hard combined board, etc.

Exemplarily, the circuit board 4 is provided with electronic elements, which can include capacitors, inductors, resistors, processors, cameras, flash, microphones, etc., but not limited thereto.

In some possible implementations, the feeding structure 41 includes a feeding elastic sheet which is electrically connected with the feeding point 33.

Referring to FIGS. 3, 4 and 6, in some embodiments, at least part of the circuit board 4 extends above the first metal part 21, the circuit board 4 is provided with at least one second grounding structure 42, and the circuit board 4 is electrically connected with the first metal part 21 through at least one second grounding structure 42, to realize grounding of the circuit board 4.

Exemplarily, at least part of the circuit board 4 extends between the first radiating part 3101 and the first metal part 21, the upper surface of this part of the circuit board 4 is electrically connected to the feeding point 33 on the lower surface of the first radiating part 3101 through the feeding structure 41, to realize feeding of the antenna component 3. The lower surface of this part of the circuit board 4 is electrically connected with the first metal part 21 by using the second grounding structure 42, to realize grounding of the circuit board 4.

In this way, the upper and lower parts of the circuit board 4 are respectively provided with electrical connecting structures, such that the circuit board 4 has good compactness, stable stress and good reliability of electrical connection.

Referring to FIGS. 3 and 4, in some possible implementations, the radiating metal sheet 31 includes at least two side edges, and the feeding point 33 and the at least one first grounding structure 32 are respectively located on different side edges of the radiating metal sheet 31.

The radiating metal sheet 31 is electrically connected with the first metal part 21 through at least one first grounding structure 32 to realize grounding of the antenna component 3. The radiating metal sheet 31 generates resonance by using the current distribution area between the feeding point 33 and the grounding point, and then generates radiated energy. Therefore, the feeding point 33 and at least one first grounding structure 32 are respectively arranged at different side edges of the radiating metal sheet 31 to ensure that the radiating metal sheet 31 has enough radiating branches for energy radiation.

Figure 8:
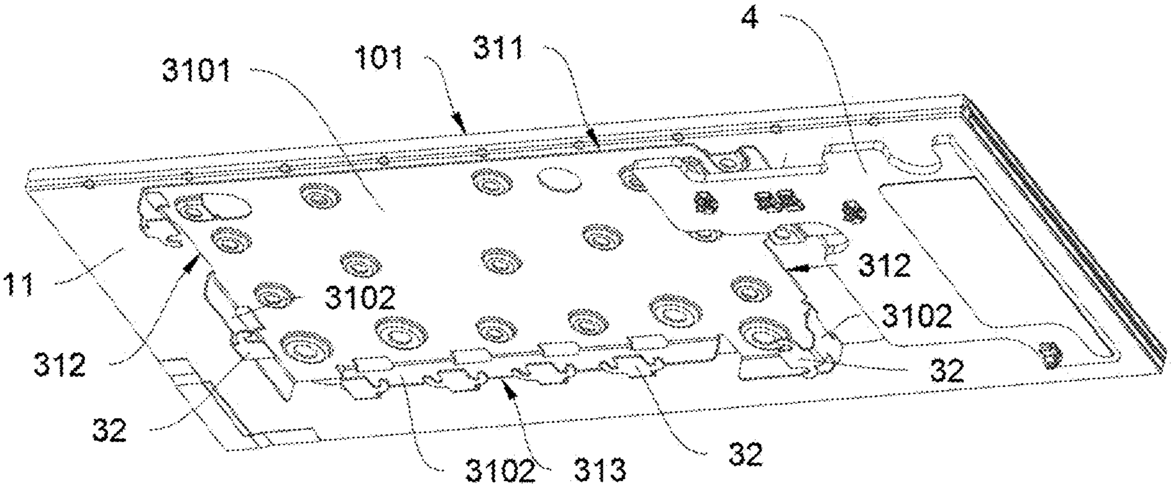
FIG. 8 is a schematic assembly diagram of a radiating metal sheet, a circuit board and a display component provided by some embodiments of the present disclosure.

Referring to FIG. 8, in some embodiments, the circuit board 4 and the first radiating part 3101 are arranged adjacent to the edge of the display component 1, and at least one feeding point 33 is located on the side edge of the first radiating part 3101 near the circuit board 4 and/or near the edge of the display component 1.

In the embodiment, the feeding point 33 is arranged on the side edge of the first radiating part 3101 near the circuit board 4 and/or near the edge of the display component 1, on one hand, the feeding point 33 is as proximate to the circuit board 4 as possible, the area of the circuit board 4 is reduced, and the structural compactness of the terminal device is increased; on the other hand, the feeding point 33 is proximate to the edge of the display component 1, to make current intensity here relatively high and the radiation performance best, such that the gap of the side edge of the display component 1 can be used to radiate energy outward, thereby ensuring better radiation performance of the antenna module 3.

Exemplarily, the first radiating part 3101 includes the first side edge 310 provided with the feeding point 33 and the third side edge 313 provided with at least two first grounding structures 32.

Figure 11:
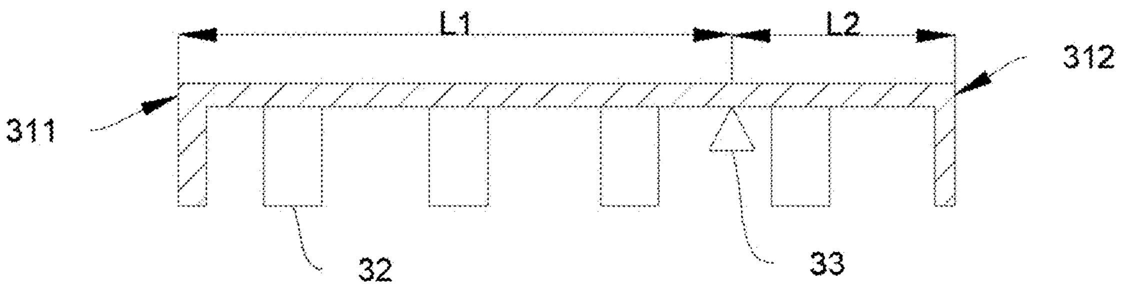
FIG. 11 is a sectional view of structure of a radiating metal sheet provided by some embodiments of the present disclosure.

Referring to FIGS. 4 and 11, in some embodiments, the distance L1 between the feeding point 33 and the second side edge 311 ranges from 30 mm to 50 mm, and the distance L2 between the feeding point 33 and the third side edge 312 ranges from 10 mm to 20 mm.

Referring to FIG. 4, in some embodiments, the distance L3 between the fourth side edge 313 and the first side edge 310 ranges from 20 mm to 30 mm; and the height of the first radiating part 3101 and the first metal part 21 of the housing component 2 ranges from 2 mm to 5 mm.

Therefore, the distance L1 from the feeding point 33 to the second side edge 311 can be suitable for controlling the resonance frequency of WIFI 2.4G, and its double frequency resonance frequency, which constitutes the first resonance frequency of 5G resonance. The distance L2 from the feeding point 33 to the third side 312 can be suitable for controlling the second resonant frequency of WIFI 5G, such that the antenna component 3 can realize dual-frequency WIFI radiation.

The radiating metal sheet 31 is small in volume, area and height, and occupies a small space, which is very suitable for use in the terminal device.

Figure 9:
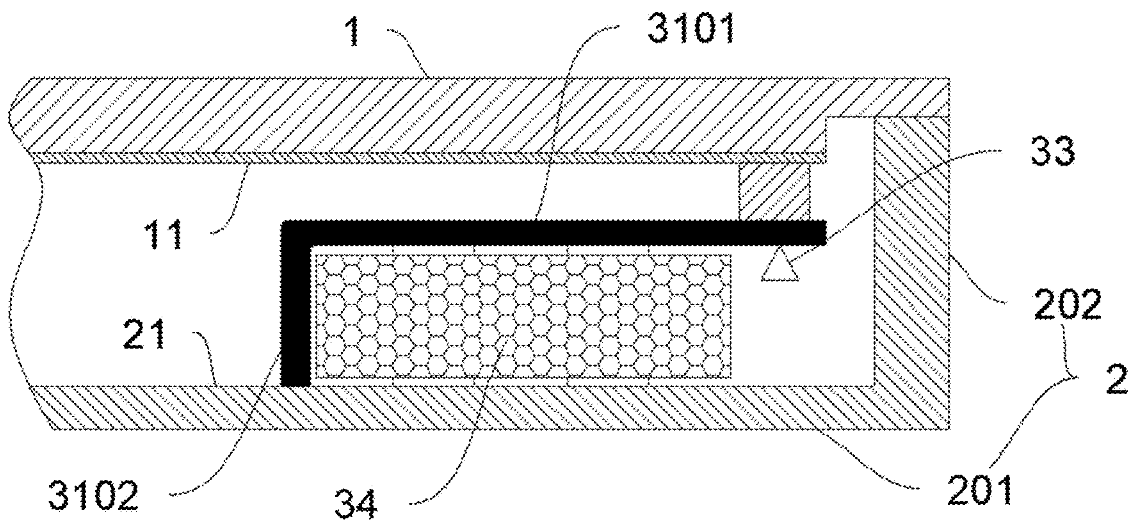
FIG. 9 is a sectional view of a partial structure of a terminal device provided by another embodiment of the present disclosure.
Figure 10:
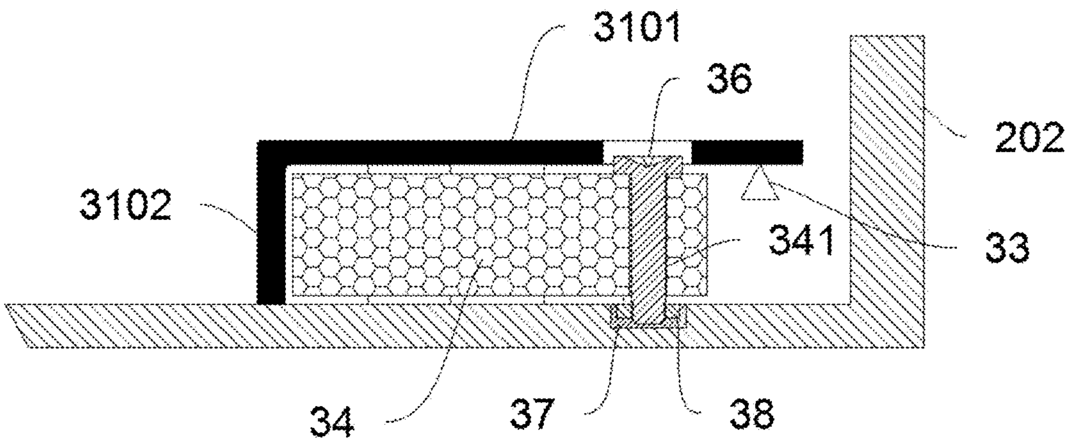
FIG. 10 is a schematic diagram of connection of a radiating metal sheet, an insulating bracket and a housing component provided by some embodiments of the present disclosure.

Referring to FIGS. 9 and 10, in some embodiments, the antenna component 3 further includes an insulating bracket 34, the insulating bracket 34 is located between the radiating metal sheet 31 and the first metal part 21, and it is used for supporting the radiating metal sheet 31.

In the terminal device of the embodiment, the thickness of the radiating metal sheet 31, which is an energy radiating component, should not be too thick, otherwise it will affect the radiation performance and increase the weight of the terminal device. Therefore, the dimensions of the radiating metal sheet 31 in the thickness direction are usually small, which also leads to poor strength and hardness of the radiating metal sheet 31, and thus the insulating bracket 34 is arranged between the radiating metal sheet 31 and the first metal part 21, and supported under the radiating metal sheet 31.

In some possible implementations, the material of the insulation bracket 34 includes, but not limited to, Polyamide (also known as Nylon), Polycarbonate (PC), Fiber Glass (FG), Polyethylene (PE), Polyether, Polyethylene Glycol Terephthalate (PET), Polymethyl Methacrylate (PMMA), Polypropylene Polystyrene (PS), Polyvinyl Chloride (PVC) etc. Any one of the above materials or any combinations of several materials thereof can be used to form the embodiment.

In another possible implementation, the insulating bracket 34 adopts a hollow structure, a honeycomb structure, in order to reduce the influence of the insulating bracket 34 on radiation performance of the radiating metal sheet 31.

Referring to FIG. 10, in some embodiments, the radiating metal sheet 31 is connected with the insulating bracket 34, and the insulating bracket 34 is connected with the first metal part 21.

In the antenna component 3 of the embodiment, the positions of the feeding point 33 and the first grounding structure 32 are reasonably designed to achieve different resonance radiation effects, and it is expected that the radiating metal sheet 31 and the first metal part 21 are insulated from each other except the grounding point of the first grounding structure 32, such that the insulating bracket 34 is adopted to achieve the function of fixedly connecting the radiating metal sheet 31 and the first metal part 21.

In some possible implementations, the radiating metal sheet 31 is adhesively connected with the insulating bracket 34, and the insulating bracket 34 is tightly and insulatedly connected with the first metal part 21.

Taking the direction shown in FIG. 10 as an example, exemplarily, the lower surface of the radiating metal sheet 31 conforms to the upper surface of the insulating bracket 34, to enable to use the adhesive materials such as double-sided adhesive tape and glue for bonded connection.

Exemplarily again, the antenna component 3 further includes a fastening screw 36, an insulating inlay 37 and a cap nut 38, and the insulating bracket 34 has a fastening hole 341.

The cap nut 38 is embedded on the first metal part 21 through the insulating inlay 37, and the cap nut 38 is insulated from the first metal part 21. Herein, the insulating inlay 37 is connected to the first metal part 21 by way of insert injection molding.

The fastening screw 36 passes through the fastening hole 341 from top to bottom and is screwed with the cap nut 38 to fasten the insulating bracket 34 on the surface of the first metal part 21, thereby realizing insulated connection between the radiating metal sheet 31 and the first metal part 21.

Referring to FIGS. 2 and 3, in some embodiments, the display component 1 includes a second metal part 11; the second metal part 11 is located on the non-display side of the display component 1, and the first radiating part 3101 is electrically connected with the second metal part 11.

Exemplarily, the second metal part 11 is disposed to be spaced from the first metal part 21, and the first radiating part 3101 is located between the first metal part 21 and the second metal part 11 and is electrically connected with the first metal part 21 and the second metal part 11 respectively.

The antenna component 3 is electrically connected with the second metal part 11 of the display component 1, such that the antenna component 3 and the second metal part 11 have the same potential, which can reduce the interference caused by the display component 1 to the antenna component 3, and at the same time makes the second metal part 11 be part of the antenna, this is beneficial to improving radiation performance of the antenna and ensuring radiation performance of the antenna component 3.

In some possible implementations, when the display component 1 adopts an LCD display panel, the second metal part 11 is the metal protective cover on the back of the LCD display panel.

In other possible implementations, when the display component 1 adopts an OLED display panel, the second metal part 11 is the copper foil on the back of the OLED display panel.

As shown in FIGS. 2 to 4 and 8, in some embodiments, the first radiating part 3101 is proximate to the first edge 110 of the second metal part 11; the antenna component 3 further includes at least one electrical connecting structure 35, the at least one electrical connecting structure 35 is electrically connected between the first radiating part 3101 and the second metal part 11; and the at least one electrical connecting structure 35 is arranged along the first edge 110.

The first radiating part 3101 is arranged near the first edge 110 of the second metal part 11, such that the first radiating part 3101 can make full use of the black edge area of the display component 1 to radiate energy outward, and further improve the radiation performance.

In the terminal device of the embodiment, the antenna component 3 is not arranged in the black edge area of the display component 1, but this area still needs to be reserved, for example, for arranging various sensors, and implementing the sealing of the housing component 2, the display component 1, etc. The first radiating part 3101 is arranged at the edge of the display component 1, which can make full use of the black edge area and improve the radiation performance.

At least one electrical connecting structure 35 is arranged along the first edge 110, which can prevent the electrical connecting structure 35 from causing the risk of top print screen dazzling to the display component 1.

The number of the electrical connecting structure 35 is, for example, one, two, three, etc. Optionally, a plurality of electrical connecting structures 35 are arranged at intervals along the first edge 110.

Optionally, at least one electrical connecting structure 35 includes conductive foam, conductive elastic sheet and copper foil.

Optionally, at least one electrical connecting structure 35 is formed by folding at least part of the edge of the radiating metal sheet 31 toward the second metal part 11.

Exemplarily, the edge of the display component 1 is aligned with the first edge 110 of the second metal part 11.

In the terminal device of the present disclosure, the circuit board 4 is arranged near the frame part 202 of the housing component 2. In order to reduce the feeding distance, the feeding point 33 of the radiating metal sheet 31 is thus arranged on the first side edge 310, which is beneficial to arranging the feeding structure 41 and simplifying the difficulty of design and assembly of the feeding structure 41. The other three side edges of the radiating metal sheet 31 (such as the second side edge 311, the third side edge 312 and the fourth side edge 313) are used for arranging the first grounding structure 32 with the grounding function, which is beneficial to facilitating arrangement of the grounding structure and reducing space occupation of the grounding structure on the frame part of the terminal device.

Figure 12:
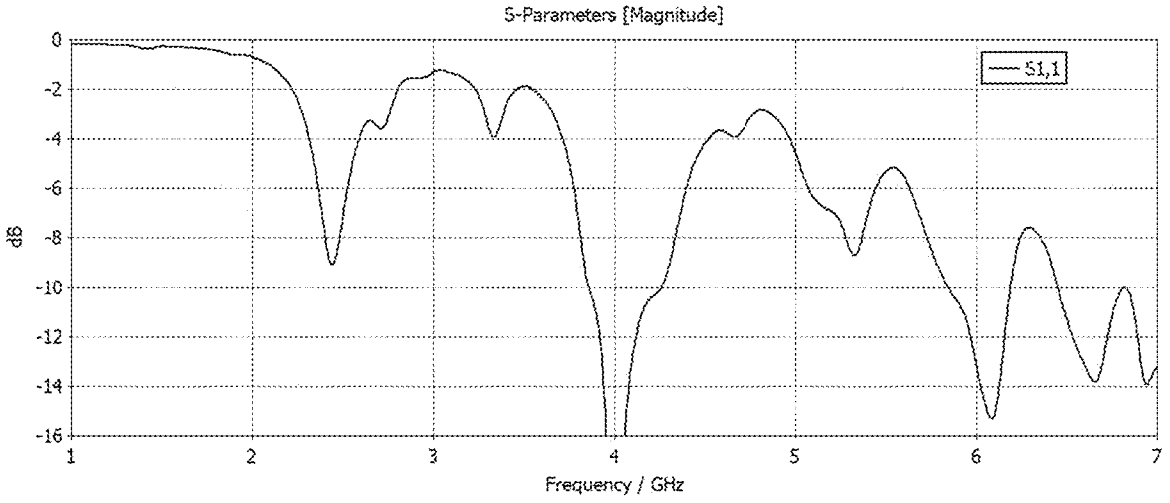
FIG. 12 is a resonance effect curve of a terminal device provided by some embodiments of the present disclosure.

Referring to FIG. 12, FIG. 12 is a resonance effect curve of a terminal device provided by some embodiments of the present disclosure. It can be seen from the figure that the lowest resonance in the range of 2.4 GHz to 2.5 GHz and the range of 5 GHz to 6 GHz of the embodiment is about −9 dB, which indicates that the antenna component 3 of the embodiment has good resonance performance in WIFI 2.4G and WIFI 5G frequency bands.

Figure 13:
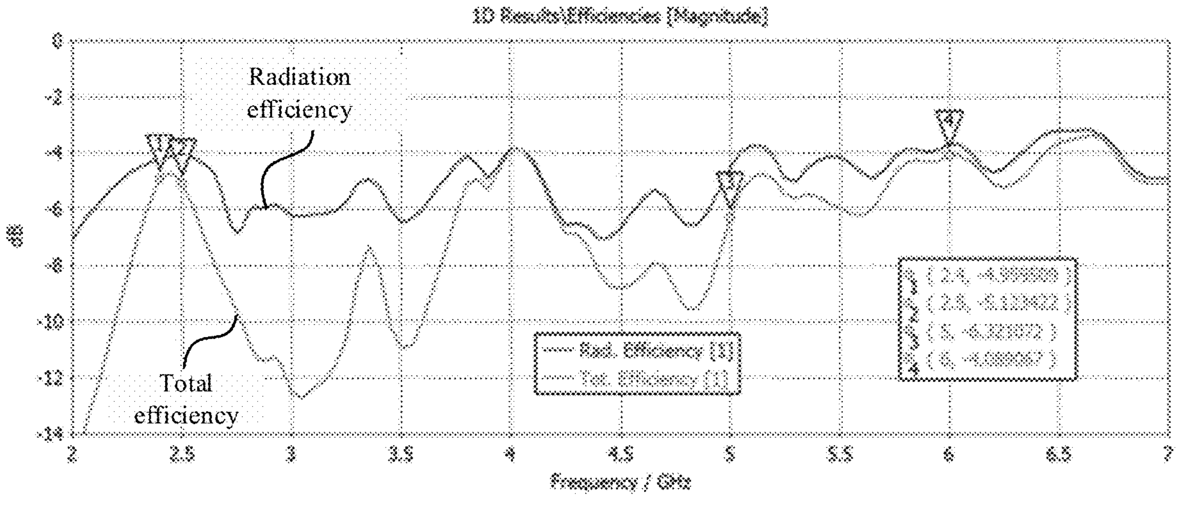
FIG. 13 is a radiation efficiency curve of a terminal device provided by some embodiments of the present disclosure.

Referring to FIG. 13, FIG. 13 is a radiation efficiency curve of a terminal device provided by some embodiments of the present disclosure, which shows the radiation efficiency and total efficiency of the antenna component. It can be seen from the figure that the two efficiencies of the antenna component 3 of the embodiment can basically reach −6 dB, which has great advantages over related technologies.

In some possible implementations, the terminal device can further include components such as a Radio Frequency (RF) circuit, a memory including one or more computer-readable storage media, an input unit, a sensor, an audio circuit, a processor including one or more processing cores, a power supply, etc.

Although not shown, the terminal device can also include a camera, a Bluetooth module, etc., which will not be described herein. In the embodiment, specifically, the processor in the terminal device will load the executable files corresponding to the processes of one or more application programs into the memory according to the following instructions, and the processor will run the application programs stored in the memory to realize various functions.

A terminal device, the terminal device includes a display component, a housing component and an antenna component;

the display component is connected with the housing component, and the antenna component is located inside the housing component;

the antenna component includes a radiating metal sheet, at least one first grounding structure and at least one feeding point;

the radiating metal sheet includes a first radiating part that extends parallel to the display component, and a second radiating part that extends away from the display component; the second radiating part is connected to at least part of a circumferential edge of the first radiating part; and the at least one feeding point is located on a surface of the first radiating part, and the at least one first grounding structure is located at an end of the second radiating part.

In some embodiments, the housing component includes a back cover part, which is arranged parallel to a non-display side of the display component;

the antenna component is located between the back cover part and the display component;

a first metal part is arranged on a side of the back cover part facing the display component; and the at least one first grounding structure is electrically connected with the first metal part to realize electrical grounding of the radiating metal sheet.

In some embodiments, the second radiating part is formed by folding at least part of an edge of the first radiating part toward the back cover part;

and/or, the at least one first grounding structure is formed by folding at least part of the second radiating part toward one side.

In some embodiments, the at least one first grounding structure includes conductive foam, conductive elastic sheet and copper foil.

In some embodiments, at least one elastic sheet member is electrically connected to a surface of the first metal part, and the number and position of the at least one elastic sheet member correspond to the at least one first grounding structure, and the at least one elastic sheet member is electrically connected with the at least one first grounding structure respectively.

In some embodiments, the first radiating part has a polygonal structure, at least one side edge of the first radiating part is proximate to an edge of the display component, and the second radiating part is correspondingly connected to at least one of the remaining side edges of the first radiating part.

In some embodiments, each of the remaining side edges of the first radiating part is respectively provided with at least one second radiating part, and an end of each second radiating part is respectively provided with the at least one first grounding structure.

In some embodiments, the first radiating part includes a first side edge proximate to the edge of the display component, and a second side edge and a third side edge located at two ends of the first side edge along the extending direction of the edge of the display component, and a fourth side edge disposed in parallel and opposite to the first side edge; and the second side edge, the third side edge and the fourth side edge are respectively provided with the at least one second radiating part, and an end of each second radiating part is respectively provided with the at least one first grounding structure.

In some embodiments, the terminal device further includes a circuit board, and at least part of the circuit board extends below the first radiating part; and the at least one feeding point is located on a lower surface of the first radiating part; at least one feeding structure is arranged on the circuit board at a position corresponding to the at least one feeding point, and the at least one feeding structure is electrically connected with the at least one feeding point.

In some embodiments, at least part of the circuit board extends above the first metal part of the housing component, and the circuit board is provided with at least one second grounding structure, and the circuit board is electrically connected with the first metal part through the at least one second grounding structure to realize grounding of the circuit board.

In some embodiments, the circuit board and the first radiating part are arranged adjacent to each other along the edge of the display component, and the at least one feeding point is located on the side edge of the first radiating part proximate to the circuit board and/or proximate to the edge of the display component.

In some embodiments, the first radiating part includes a first side edge and a third side edge, the first side edge is provided with one feeding point, and the third side edge is provided with at least two grounding points.

In some embodiments, the first radiating part is a rectangular structure; and the first radiating part further includes a second side edge and a fourth side edge; and a distance L1 between the feeding point located on the first side edge and the second side edge ranges from 30 mm to 50 mm, and a distance L2 between the feeding point located on the first side edge and the third side edge ranges from 10 mm to 20 mm.

In some embodiments, a distance L3 between the fourth side edge and the first side edge ranges from 20 mm to 30 mm; and a height of the first radiation part and the first metal part of the housing component ranges from 2 mm to 5 mm.

In some embodiments, the antenna component further includes an insulating bracket, which is located between the first radiating part and the first metal part of the housing component, and the insulating bracket is used for supporting the first radiating part.

In some embodiments, the radiating metal sheet is connected with the insulating bracket, and the insulating bracket is connected with the first metal part.

In some embodiments, the display component includes a second metal part; and the second metal part is located on the non-display side of the display component, and the first radiating part is electrically connected with the second metal part.

In some embodiments, the first radiating part is arranged proximate to a first edge of the second metal part;

the antenna component further includes at least one electrical connecting structure, which is electrically connected between the first radiating part and the second metal part; and the at least one electrical connecting structure is arranged along the first edge.

In some embodiments, the at least one electrical connecting structure is formed by folding at least part of the edge of the first radiating part toward the second metal part.

In some embodiments, the at least one electrical connecting structure includes conductive foam, conductive elastic sheet and copper foil.

The technical solutions provided by the present disclosure have the following beneficial effects:

The terminal device of the present disclosure includes the display component, the housing component and the antenna component, the antenna component is located inside the housing component, and the antenna component includes the first radiating part that extends parallel to the display component and the second radiating part that extends away from the display component, and the second radiating part is connected to the circumferential edge of the first radiating part, such that the radiating metal sheet has a dual structure of a patch antenna and a cavity antenna, resulting in that the antenna component has better radiation performance and can achieve a wider range of frequency coverage. The antenna component is of simple structure, has the advantages of simple production and assembly process, low product cost and good consistency.

It should be noted that the "several" and "at least one" mentioned in this document refer to one or more, and the "a plurality of" and "at least two" refer to two or more. The "and/or", which describes the relationship of related objects, indicates that there can be three types of relationships, for example, A and/or B can indicate that there are three situations: A alone, both A and B, and B alone. The character "/" generally indicates that the objects associated in context is of an "or" relationship.

In addition, the terms "first" and "second" are only used for descriptive purposes, and cannot be understood as indicating or implying relative importance or implicitly indicating the quantity of indicated technical features. Therefore, the features defined with "first" and "second" can include one or more features explicitly or implicitly. In the description of the present disclosure, the meaning of "a plurality of" is two or more, unless otherwise specifically defined.

In the present disclosure, unless otherwise specified and limited, the first feature being "above" or "below" the second feature can include the direct contact between the first feature and second feature, and can also include the contact between the first feature and second feature through another feature between them instead of direct contact. Furthermore, the first feature being "on", "above" and "on top of" the second feature includes that the first feature is directly above and obliquely above the second feature, or only indicates that the horizontal height of the first feature is higher than that of the second feature. The first feature is "under", "below", "following" the second feature includes that the first feature is directly below and obliquely below the second feature, or only indicates that the horizontal height of the first feature is smaller than that of the second feature.

In the description of this specification, the description referring to the terms "some implementations", "one implementation", "several implementations", "illustrative implementations", "example", "specific example" or "some examples" means that the specific features, structures, materials or characteristics described in connection with the implementations or examples are included in at least one implementation or example of the present disclosure.

The above are only embodiments of the present disclosure, not intended to limit the present disclosure. Any modifications, equivalent substitutions, improvements, etc. made within the principles of the present disclosure should be included in the protection scope of the present disclosure.

The invention claimed is:

1. A terminal device, comprising:

a display component, a housing and an antenna; wherein:

the display component is connected with the housing, and the antenna is disposed inside the housing;

the antenna is located below the display component of the terminal device and within a coverage area of the display component, and comprises a radiating metal sheet, at least one first grounding structure and at least one feeding point;

the radiating metal sheet comprises a first radiating part that is located below and extends parallel to the display component, and a second radiating part that extends away from the display component; the second radiating part is connected to at least part of a circumferential edge of the first radiating part; and the at least one feeding point is disposed on a surface of the first radiating part, and the at least one first grounding structure is disposed at an end of the second radiating part, wherein a patch antenna is realized by the first radiating part, and a cavity antenna is realized by the first radiating part and the second radiating part to enhance the radiation performance of the radiating metal sheet, and wherein the antenna radiates energy outward through a black edge area of a side edge of the display component.

2. The terminal device according to claim 1, wherein the housing comprises a back cover, and the back cover is arranged parallel to a non-display side of the display component;

the antenna is located between the back cover and the display component;

a first metal part is arranged on a side of the back cover facing the display component; and the at least one first grounding structure is electrically connected with the first metal part to realize electrical grounding of the radiating metal sheet.

3. The terminal device according to claim 2, wherein the terminal device is further configured by adopting at least one of:

forming the second radiating part by folding at least part of an edge of the first radiating part toward the back cover; or forming the at least one first grounding structure by folding at least part of the second radiating part toward one side.

4. The terminal device according to claim 2, wherein at least one elastic sheet member is electrically connected to a surface of the first metal part, and the number and position of the at least one elastic sheet member correspond to the at least one first grounding structure, and the at least one elastic sheet member is electrically connected with the at least one first grounding structure respectively.

5. The terminal device according to claim 2, wherein the antenna further comprises an insulating bracket, the insulating bracket located between the first radiating part and the first metal part of the housing, and the insulating bracket is configured for supporting the first radiating part.

6. The terminal device according to claim 5, wherein the radiating metal sheet is connected with the insulating bracket, and the insulating bracket is connected with the first metal part.

7. The terminal device according to claim 1, wherein the at least one first grounding structure comprises conductive foam, conductive elastic sheet and copper foil.

8. The terminal device according to claim 1, wherein the first radiating part has a polygonal structure, at least one side edge of the first radiating part is proximate to an edge of the display component, and the second radiating part is correspondingly connected to at least one of the remaining side edges of the first radiating part.

9. The terminal device according to claim 8, wherein each of the remaining side edges of the first radiating part is respectively provided with at least one second radiating part, and an end of each second radiating part is respectively provided with the at least one first grounding structure.

10. The terminal device according to claim 8, wherein the first radiating part comprises a first side edge proximate to the edge of the display component, and a second side edge and a third side edge located at two ends of the first side edge along an extending direction of the edge of the display component, and a fourth side edge disposed in parallel and opposite to the first side edge; and the second side edge, the third side edge and the fourth side edge are respectively provided with the at least one second radiating part, and an end of each second radiating part is respectively provided with the at least one first grounding structure.

11. The terminal device according to claim 1, wherein the terminal device further comprises a circuit board, and at least part of the circuit board extends below the first radiating part; and the at least one feeding point is located on a lower surface of the first radiating part; at least one feeding structure is provided on the circuit board at a position corresponding to the at least one feeding point, and the at least one feeding structure is electrically connected with the at least one feeding point.

12. The terminal device according to claim 11, wherein at least part of the circuit board extends above the first metal part of the housing, and the circuit board is provided with at least one second grounding structure, and the circuit board is electrically connected with the first metal part through the at least one second grounding structure to realize grounding of the circuit board.

13. The terminal device according to claim 11, wherein the circuit board and the first radiating part are arranged adjacent to each other along the edge of the display component, and the at least one feeding point is located on the side edge of the first radiating part proximate to the circuit board or proximate to the edge of the display component.

14. The terminal device according to claim 13, wherein the first radiating part comprises a first side edge and a third side edge, the first side edge is provided with one feeding point, and the third side edge is provided with at least two grounding points.

15. The terminal device according to claim 14, wherein the first radiating part is a rectangular structure; and the first radiating part further comprises a second side edge and a fourth side edge; and a distance L1 between the feeding point located on the first side edge and the second side edge ranges from 30 mm to 50 mm, and a distance L2 between the feeding point located on the first side and the third side edge ranges from 10 mm to 20 mm.

16. The terminal device according to claim 15, wherein a distance L3 between the fourth side edge and the first side edge ranges from 20 mm to 30 mm; and a height of the first radiation part and the first metal part of the housing ranges from 2 mm to 5 mm.

17. The terminal device according to claim 1, wherein the display component comprises a second metal part; and the second metal part is located on the non-display side of the display component, and the first radiating part is electrically connected with the second metal part.

18. The terminal device according to claim 17, wherein the first radiating part is arranged proximate to a first edge of the second metal part;

the antenna further comprises at least one electrical connecting structure, the at least one electrical connecting structure is electrically connected between the first radiating part and the second metal part; and the at least one electrical connecting structure is arranged along the first edge.

19. The terminal device according to claim 18, wherein the at least one electrical connecting structure is formed by folding at least part of the edge of the first radiating part toward the second metal part.

20. The terminal device according to claim 18, wherein the at least one electrical connecting structure comprises conductive foam, conductive elastic sheet and copper foil.

* * * * *